United States Patent
Yaksick et al.

(10) Patent No.: US 9,110,589 B1
(45) Date of Patent: *Aug. 18, 2015

(54) TAB BAR CONTROL FOR MOBILE DEVICES

(75) Inventors: Jeffrey D. Yaksick, Sunnyvale, CA (US); David A. Brown, Mountain View, CA (US); Michael A. Cleron, Menlo Park, CA (US); Amar S. Gandhi, Mountain View, CA (US); James B. Miller, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 12/840,709

(22) Filed: Jul. 21, 2010

(51) Int. Cl.
*G06F 3/0488* (2013.01)
*G06F 3/0482* (2013.01)

(52) U.S. Cl.
CPC .......... *G06F 3/04886* (2013.01); *G06F 3/0482* (2013.01); *G06F 3/04883* (2013.01)

(58) Field of Classification Search
CPC G06F 3/0482; G06F 3/04883; G06F 3/04886
USPC ......................................... 715/777, 863, 864
See application file for complete search history.

(56) References Cited

U.S. PATENT DOCUMENTS

| | | | |
|---|---|---|---|
| 8,046,721 B2 | 10/2011 | Chaudhri et al. | |
| 2004/0155909 A1* | 8/2004 | Wagner | 345/854 |
| 2004/0212617 A1 | 10/2004 | Fitzmaurice et al. | |
| 2005/0212760 A1 | 9/2005 | Marvit et al. | |
| 2005/0253817 A1 | 11/2005 | Rytivaara et al. | |
| 2006/0267967 A1 | 11/2006 | Hinckley et al. | |
| 2007/0150826 A1* | 6/2007 | Anzures et al. | 715/772 |
| 2007/0150842 A1* | 6/2007 | Chaudhri et al. | 715/863 |
| 2007/0283292 A1 | 12/2007 | Bucher et al. | |
| 2008/0204423 A1 | 8/2008 | Kim | |
| 2008/0220752 A1* | 9/2008 | Forstall et al. | 455/415 |
| 2008/0287169 A1 | 11/2008 | Kim et al. | |
| 2009/0061837 A1* | 3/2009 | Chaudhri et al. | 455/418 |
| 2009/0064055 A1 | 3/2009 | Chaudhri et al. | |
| 2009/0094562 A1* | 4/2009 | Jeong et al. | 715/863 |
| 2009/0265666 A1* | 10/2009 | Hsieh et al. | 715/835 |
| 2009/0288032 A1* | 11/2009 | Chang et al. | 715/776 |
| 2010/0001967 A1* | 1/2010 | Yoo | 345/173 |
| 2010/0037185 A1 | 2/2010 | Li | |
| 2010/0099394 A1* | 4/2010 | Hainzl | 455/418 |

(Continued)

OTHER PUBLICATIONS

Christoph Grundel et al., "A Direct Manipulation User Interface for the Control of Communication Processes—Making Call Handling Manageable," Proceedings of Human Factors in Telecommunications, 1999, 8 pages.

*Primary Examiner* — Tuyetlien Tran
(74) *Attorney, Agent, or Firm* — Fish & Richardson P.C.

(57) ABSTRACT

Methods, systems, and apparatus, including computer programs encoded on a computer storage medium, for providing tab bar controls on a mobile computing device are described. In one aspect, a method includes displaying a first tab graphic in a first tab bar control, the first tab bar control being displayed at a first default position on a first edge of a touchscreen display, detecting a user selection in a first region of the touchscreen display, the first region associated with the first tab graphic, detecting user motion, animating the first tab bar control to extend from the first edge of the touch-screen display in response to detecting user motion, determining a measure of user motion, comparing the measure of user motion to a threshold measure, and performing one or more functions on the mobile device in response to the measure of user motion exceeding the threshold measure.

16 Claims, 9 Drawing Sheets

(56) References Cited

U.S. PATENT DOCUMENTS

| | | |
|---|---|---|
| 2010/0127998 A1* | 5/2010 | Hyun .............................. 345/173 |
| 2010/0146384 A1* | 6/2010 | Peev et al. ...................... 715/255 |
| 2010/0159995 A1* | 6/2010 | Stallings et al. .............. 455/566 |
| 2010/0162169 A1* | 6/2010 | Skarp |
| 2010/0162182 A1* | 6/2010 | Oh et al. ....................... 715/863 |
| 2010/0227640 A1* | 9/2010 | Kim et al. ................... 455/550.1 |
| 2010/0248689 A1* | 9/2010 | Teng et al. ..................... 455/411 |
| 2010/0257490 A1* | 10/2010 | Lyon et al. ..................... 715/863 |
| 2010/0269040 A1* | 10/2010 | Lee ................................ 715/702 |
| 2010/0306705 A1* | 12/2010 | Nilsson ........................ 715/835 |
| 2011/0087970 A1* | 4/2011 | Swink et al. ................... 715/752 |
| 2011/0163972 A1* | 7/2011 | Anzures et al. ................ 345/173 |
| 2011/0271181 A1* | 11/2011 | Tsai et al. ...................... 715/702 |

\* cited by examiner

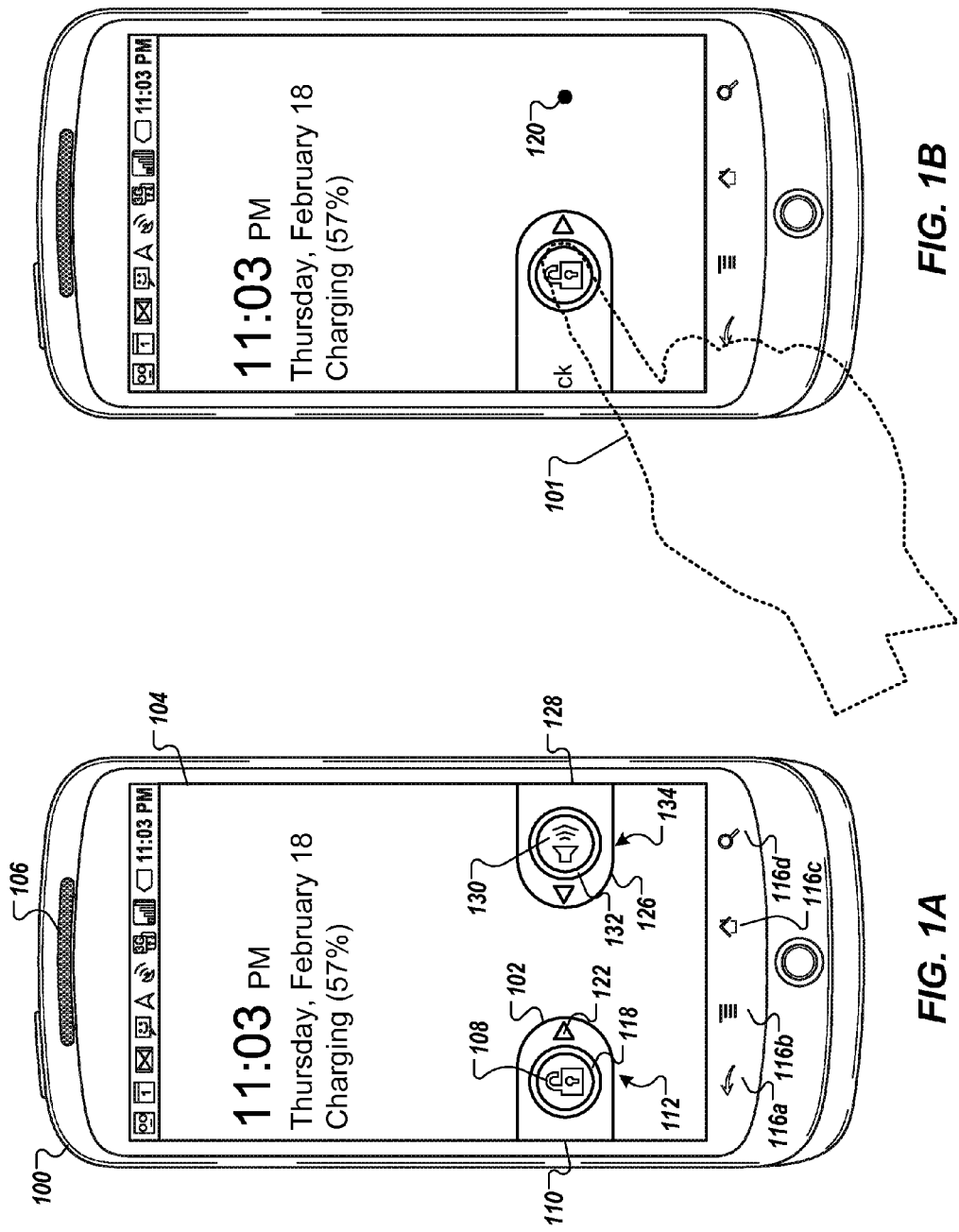

TAB BAR CONTROL FOR MOBILE DEVICES

BACKGROUND

This specification generally relates to systems and techniques for a user interface tab bar control affordance for a mobile computing device.

In some implementations, it is advantageous to protect an underlying application running on a mobile computing device from receiving accidental user input. For example, user input can be received from a keyboard, pointing device, or on-screen contact with a touchscreen included with the mobile computing device. The user may place the mobile computing device in a location that may inadvertently provide erroneous input to the device (e.g., the user places the device in a pocket, backpack, or handbag). Locking the mobile computing device can prevent the occurrence of the accidental input as the computing device can ignore any user input it receives while in a locked state.

SUMMARY

According to one innovative aspect of the subject matter described in this specification, a mobile computing device with a touchscreen can lock the touchscreen to prevent accidental input to underlying applications running on the mobile computing device. A user interface (UI) touchscreen can include multiple tab bar controls that allow the user to interact with the mobile computing device in the locked state. The user can activate each of the tab bar controls on the touchscreen using a pulling gesture to slide the tab bar control across the touchscreen. The pulling gesture moves a graphic on one side of the tab bar control towards an the opposite side of the touchscreen. When the graphic moves a sufficient degree, the mobile computing device performs an operation designated by the tab bar control dependent upon the state of the mobile computing device.

For example, the mobile device can be a mobile phone. A user can use a tab bar control to unlock their mobile phone from a locked state. The user can use a tab bar control to control a ringer of the mobile phone (e.g., turn off (silence) the ringer or turn on (un-silence) the ringer). The user can also use a tab bar control to answer an incoming call on the mobile device when it is in a locked state. The user can also use a tab bar control to decline an incoming call on the mobile device when it is in a locked state.

The activation of a tab bar control can occur using a simple gesture performed by the user (e.g., a one finger pulling gesture of the tab bar across the touchscreen). However, the activation of the tab bar control to unlock the mobile computing device or answer or decline an incoming call can be a difficult, if not impossible, action to perform accidentally by inadvertent contact with the touchscreen (e.g., while the device is in the user's pocket).

In general, another innovative aspect of the subject matter described in this specification may be embodied in methods that include the actions of displaying a first tab graphic in a first tab bar control, the first tab bar control being displayed at a first default position on a first edge of a touchscreen display of a mobile device, detecting a user selection in a first region of the touchscreen display, the first region being associated with the first tab graphic, detecting user motion corresponding to the user selection, animating the first tab bar control to extend from the first edge of the touch-screen display in response to detecting user motion, determining a measure of user motion, comparing the degree of user motion to a threshold measure, and performing one or more functions on the mobile device in response to the measure of user motion exceeding the threshold measure. Other implementations of this aspect include corresponding systems, apparatus, and computer programs, configured to perform the actions of the methods, encoded on computer storage devices.

These and other implementations may each optionally include one or more of the following features. For instance, the one or more functions may include entering or exiting an unlocked mode, answering or declining a received call, and changing a mode of a ringer; the actions may further include continuing animation of the first tab bar control to extend from the first edge to a second edge of the touchscreen display in response to the measure of user motion exceeding the threshold measure; the actions may further include detecting cessation of the user selection, determining, upon detecting cessation of the user selection, that the measure of user motion is less than the threshold measure, and animating the first tab bar control to retract back toward the first edge of the touchscreen display to the first default position; the one or more functions may further include removing the first tab bar control from the touchscreen display, and displaying a plurality of icons on the touchscreen display, each icon corresponding to a respective application executable by the mobile device; the actions may further include concurrent with displaying the first tab graphic, displaying a second tab graphic in a second tab control bar, the second tab bar control being displayed at a second default position on a second edge of the touchscreen display, the second edge being opposite from the first edge, and removing the second tab graphic from the touchscreen display upon detecting the user selection in the first region; the actions may further include displaying a first target in response to detecting the user selection in the first region, wherein the first tab control bar is animated to extend towards the first target without displaying a defined path between the first tab bar control and the first target; the operations may further include displaying a first target in response to detecting the user selection in the first region, and displaying a defined path between the first tab bar control and the first target, wherein the first tab control bar is animated to extend towards the first target along the defined path; the operations may further include displaying a first target on the touchscreen display in response to detecting the user selection in the first region, the first target corresponding to the threshold measure, and determining that the measure of user motion is equal to or greater than the threshold measure when the first tab control bar contacts the first target on the touchscreen display; the actions may further include displaying scrolling text within the first tab bar control as the first tab control bar extends from the first edge of the touchscreen display, the scrolling text indicating the at least one or more functions; the actions may further include highlighting the first tab graphic upon detecting the user selection, and may include the highlighting including changing a color of the first tab graphic from a first color to a second color, the second color being brighter than the first color; the actions may further include detecting an orientation change of the mobile device, and rotating the first tab graphic in the first tab bar control in response to detecting the orientation change; and the measure includes a distance and the threshold measure includes a threshold distance.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 1A-1D demonstrate the unlocking of a mobile computing device using an unlock tab bar control displayed on a touchscreen display device.

Like reference numbers represent corresponding parts throughout.

DETAILED DESCRIPTION

Figure 1D:
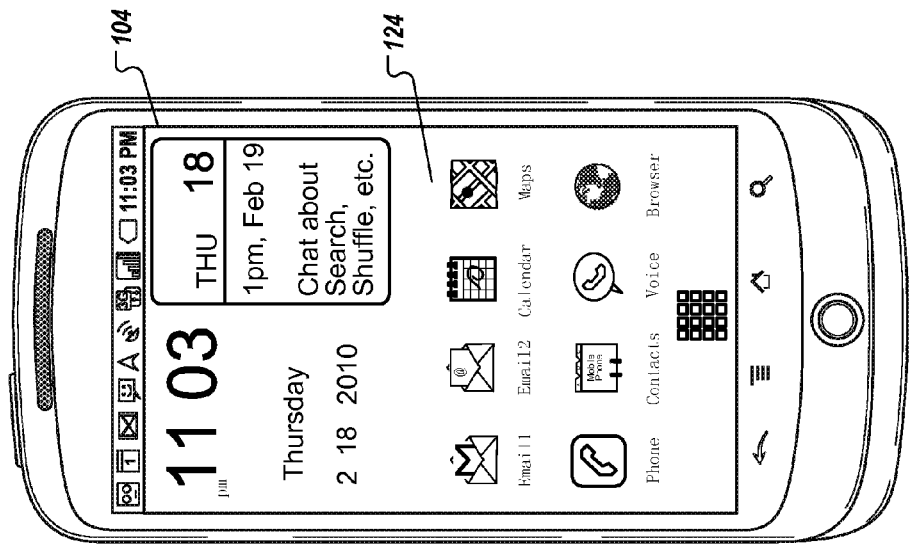

FIGS. 1A-1D are illustrations demonstrating the unlocking of a mobile computing device 100 using an unlock tab bar control 102 displayed on a touchscreen display device 104.

In these illustrations, the mobile computing device 100 is depicted as a handheld mobile telephone (e.g., a smartphone or an application telephone) that includes the touchscreen display device 104 for presenting content to a user of the mobile computing device 100. The mobile computing device 100 includes various input devices (e.g., the touchscreen display device 104, a keyboard (not shown)) for receiving user input that influences the operation of the mobile computing device 100. In further implementations, the mobile computing device 100 may be a laptop computer, a tablet computer, a personal digital assistant, an embedded system (e.g., a car navigation system), a desktop computer, or a computerized workstation.

The mobile computing device 100 may include various visual, auditory, and tactile user-output mechanisms. An example visual output mechanism is the touchscreen display device 104, which can visually display video, graphics, images, and text that combine to provide a visible user interface. An example tactile user-output mechanism is a small electric motor that is connected to an unbalanced weight to provide a vibrating alert (e.g., to silently vibrate the mobile computing device 100 to alert a user of an incoming telephone call or confirm user contact with the touchscreen display device 104). The mobile computing device 100 may include one or more speakers 106 that convert an electrical signal into sound, for example, music, an audible alert, or voice of an individual in a telephone call. The mobile computing device 100 may include mechanical or touch sensitive buttons 116a-d.

The mobile computing device 100 can determine a position of physical contact with the touchscreen display device 104 (e.g., a position of contact by a finger 101 or a stylus). Using the touchscreen display device 104, various "virtual" input mechanisms may be produced, where a user interacts with a graphical user interface element depicted on the touchscreen display device 104 by contacting the graphical user interface element. As shown in FIG. 1A, the graphical user interface elements can be an unlock tab graphic 108 included in a first region 118 of the unlock tab bar control 102 and a sound off tab graphic 130 included in a second region 132 of a sound off tab bar control 126. The unlock tab bar control 102 is located along a first edge 110 of the touchscreen display device 104.

The sound off tab bar control 126 is located along a second edge 128 of the touchscreen display device 104.

In some implementations, the unlock tab graphic 108 may be a pictorial representation of the function performed by interacting with the graphical user interface element, in this example, the unlock tab bar control 102. As shown in FIG. 1A, the pictorial representation for the unlock tab graphic 108 is an unlocked lock signifying the unlocking of the mobile computing device 100 when interacting with the unlock tab bar control 102.

Figure 1C:
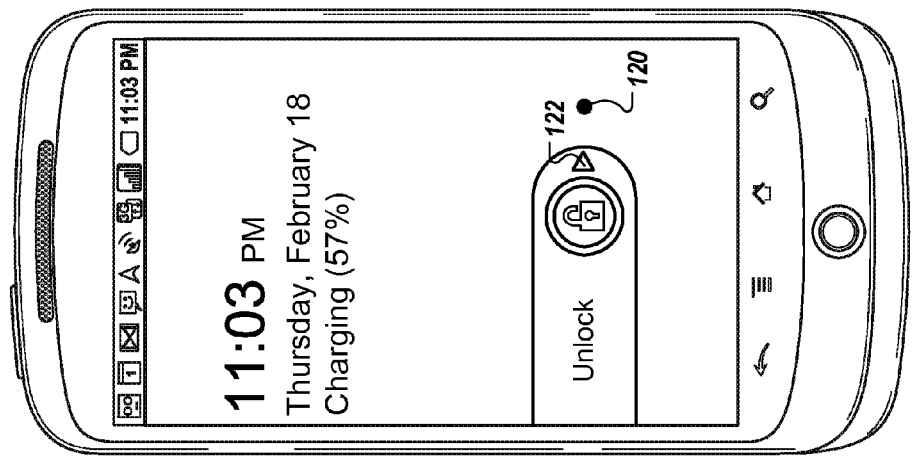

Referring to the example shown in FIGS. 1A-1C, a user wants to unlock the mobile computing device 100 from a locked state. The user selects the unlock tab bar control 102 by placing a finger 101 in contact with the unlock tab graphic 108. Upon contact with the unlock tab graphic 108, the sound off tab bar control 126 disappears or retracts towards the second edge 128 and is no longer displayed on the touchscreen display device 104. The touchscreen display device 104 then displays a first contact point 120, as shown in FIG. 1B. The first contact point 120 generally indicates a threshold measure of movement to be achieved to induce unlocking of the mobile device 100. That is, unlocking of the mobile device can occur when a measure of motion of the user's finger across the touchscreen display device 104 is equal to or greater than the threshold measure. The measure can include a distance and the threshold measure can include a threshold distance In some implementations, the mobile computing device 100 provides tactile feedback when the user's finger initially makes contact with the unlock tab graphic 108. In some implementations, while the user's finger remains in contact with the unlock tab graphic 108, the unlock tab graphic 108 and the unlock tab bar control 102 are highlighted (e.g., displayed brighter than before contact). While the user's finger maintains contact with the unlock tab graphic 108, the user, using a pushing or pulling motion, can move their finger across the touchscreen display device 104. This movement further animates the unlock tab bar control 102 to appear as though it is being dragged across the touchscreen display device 104 from a first default position 112 towards the first contact point 120, as shown in FIGS. 1B and 1C. As the user moves their finger across the touchscreen display device 104, the touchscreen display device 104 animates the display of the unlock tab bar control 102 to extend from the first edge 110. As the touchscreen display device 104 animates the display of the unlock tab bar control 102, the term "Unlock" can be displayed and/or scrolled within the unlock tab bar control 102 as the unlock tab bar control 102 is extended, as shown in FIGS. 1B-1C.

The animation of the unlock tab bar control 102 continues across the touchscreen display device 104 as long as the user maintains contact with the unlock tab graphic 108, while dragging the unlock tab bar control 102 across the touchscreen display device 104. When a first arrow 122 included on the unlock tab bar control 102 makes contact with the first contact point 120, the unlock tab bar control 102 changes color. The animation of the unlock tab bar control 102 continues across the touchscreen display device 104 towards the second edge 128 and is then no longer displayed on the touchscreen display device 104. The mobile computing device 100 unlocks and, in its unlocked state, the mobile computing device 100 displays a graphical user interface 124 on the touchscreen display device 104 as shown in FIG. 1D. For example, the graphical user interface 124 is a collection of one or more graphical interface elements. The graphical user interface 124 may be static (e.g., the display appears to remain the same over a period of time), or may be dynamic (e.g., the graphical user interface includes graphical interface elements that animate without user input).

In some implementations, a background wallpaper of the touchscreen display device 104 can be visible behind the unlock tab bar control 102 even as the user drags the unlock tab bar control 102 across the touchscreen display device 104 (e.g., the unlock tab bar control 102 is semitransparent). When the first arrow 122 makes contact with the first contact point 120, the unlock tab bar control 102 can change color and become opaque (e.g., the background wallpaper of the touchscreen display device 104 is no longer visible behind the unlock tab bar control 102).

In some situations, a user may decide while dragging the unlock tab bar control 102 towards the first contact point 120 that they no longer want to unlock the mobile computing device 100. The user then removes their finger from the unlock tab graphic 108. This disconnects or breaks the physical contact between the user and the touchscreen display device 104. The unlock tab bar control 102 is no longer dragged across the touchscreen display device 104 and retracts back to the first default position 112. The user may also move their finger backwards towards the first edge 110 of the touchscreen display device 104, retracting the unlock tab bar control 102 back to the first default position 112. The touchscreen display device 104 displays the sound off tab bar control 126 along with the unlock tab bar control 102 as shown in FIG. 1A. The mobile computing device 100 remains in a locked state.

FIGS. 2A-2F are illustrations demonstrating controlling a ringer of a mobile computing device 100 using tab bar controls displayed on a touchscreen display device 104. Specifically, FIGS. 2A-2D are illustrations demonstrating the silencing of the ringer of the mobile computing device 100 using the sound off tab bar control 126 displayed on the touchscreen display device 104.

In some implementations, the sound off tab graphic 130 may be a pictorial representation of the current state of the speaker or ringer of the mobile computing device 100 and the function performed by interacting with the graphical user interface element, in this example, the sound off tab bar control 126. As shown in FIG. 2A, the pictorial representation of a speaker emitting sound for the sound off tab graphic 130 signifies the ringer of the mobile computing device 100 is currently enabled. The user interacting with the sound off tab bar control 126 can control the ringer (e.g., disable the ringer and silence the mobile computing device 100).

Figure 2B:
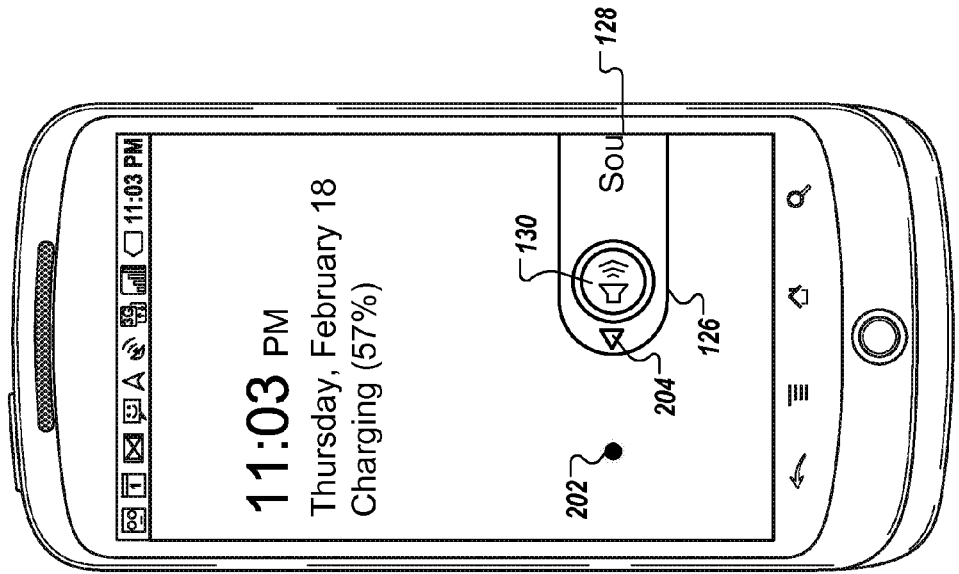
FIGS. 2A-2F are illustrations demonstrating controlling a ringer of a mobile computing device using tab bar controls displayed on a touchscreen display device.
Figure 2A:
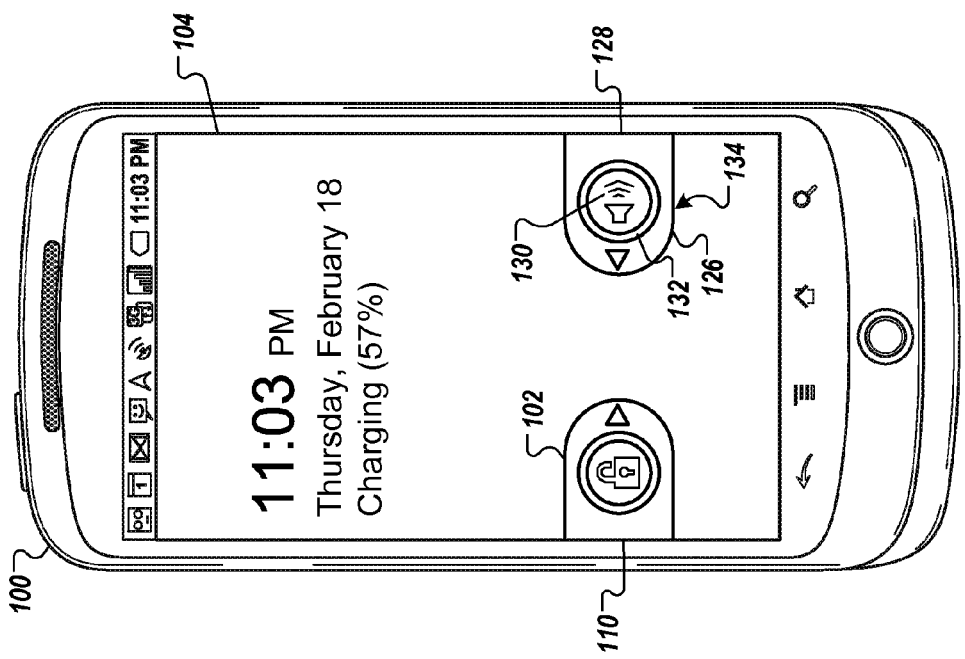

Referring to FIGS. 2A-2D, a user wants to silence the ringer of the mobile computing device 100 while the mobile computing device 100 is in a locked state. For example, it is a Sunday morning and the user is at a church service where any audible tone from the mobile computing device 100 would disturb the other parishioners and disrupt the church service. The user selects the sound off tab bar control 126 by placing a finger in contact with the sound off tab graphic 130 included in the second region 132 of the sound off tab bar control 126. Upon contact with the sound off tab graphic 130, the unlock tab bar control 102 disappears or retracts towards the first edge 110 and is no longer displayed on the touchscreen display device 104. The touchscreen display device 104 then displays a second contact point 202, as shown in FIG. 2B. The second contact point 202 generally indicates a threshold measure of movement to be achieved to induce silencing of the ringer of the mobile device 100. That is, silencing of the ringer can occur when a measure of motion of the user's finger across the touchscreen display device 104 is equal to or greater than the threshold measure. In some implementations, the mobile computing device 100 provides tactile feedback when the user's finger initially makes contact with the sound off tab graphic 130. In some implementations, while the user's finger remains in contact with the sound off tab graphic 130, the sound off tab graphic 130 and the sound off tab bar control 126 are highlighted (e.g., displayed brighter than before contact).

While the user's finger maintains contact with the sound off tab graphic 130, the user, using a pulling motion, can further drag the sound off tab bar control 126 across the touchscreen display device 104. The user can drag the sound off tab bar control 126 from a second default position 134 towards the second contact point 202, as shown in FIGS. 2B and 2C. As the user drags the sound off tab bar control 126 across the touchscreen display device 104, the touchscreen display device 104 animates the display of the sound off tab bar control 126 to extend from the second edge 128. As the touchscreen display device 104 animates the display of the sound off tab bar control 126, the words "Sound Off" can be displayed within the sound off tab bar control 126 as the sound off tab bar control 126 is extended, as shown in FIG. 2C.

The animation of the sound off tab bar control 126 continues across the touchscreen display device 104 as long as the user maintains contact with the sound off tab graphic 130 while dragging the sound off tab bar control 126 across the touchscreen display device 104. Referring to FIG. 2C, when a second arrow 204 included on the sound off tab bar control 126 makes contact with the second contact point 202, the touchscreen display device 104 displays a sound off indicator 212 showing that the sound for the mobile computing device 100 is turned off. The sound off indicator 212 can include a sound off graphic 214 providing a graphic indicator representing the disabling (turning off) of the ringer and the silencing of the mobile computing device 100.

Additionally, when the second arrow 204 makes contact with the second contact point 202, the animation of the sound off tab bar control 126 continues across the touchscreen display device 104 towards the first edge 110 of the touchscreen display device 104. The ringer of the mobile computing device 100 is disabled (e.g., the mobile computing device 100 is silenced) and the touchscreen display device 104 displays the graphical user interface elements shown in FIG. 2D.

Figure 2D:
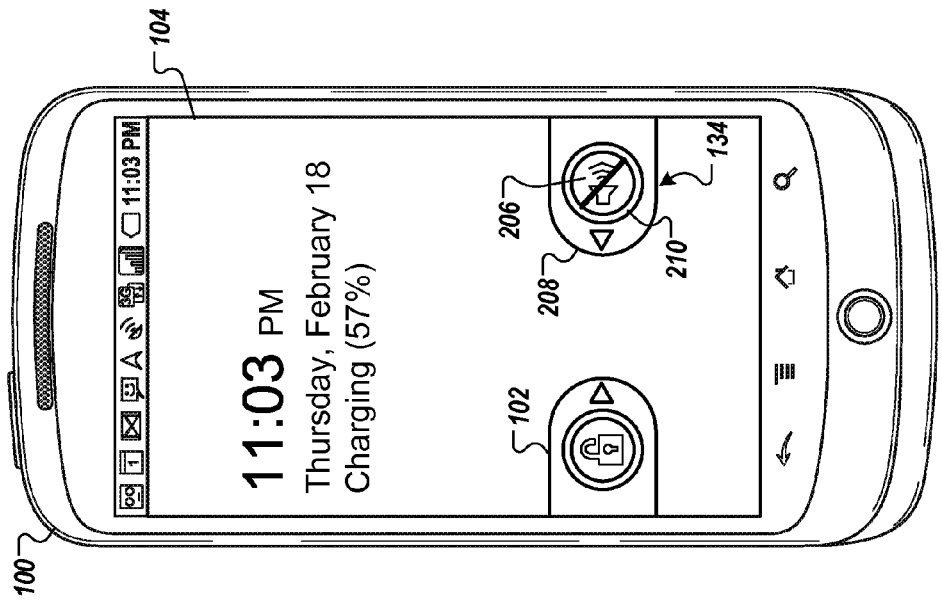
Figure 2C:
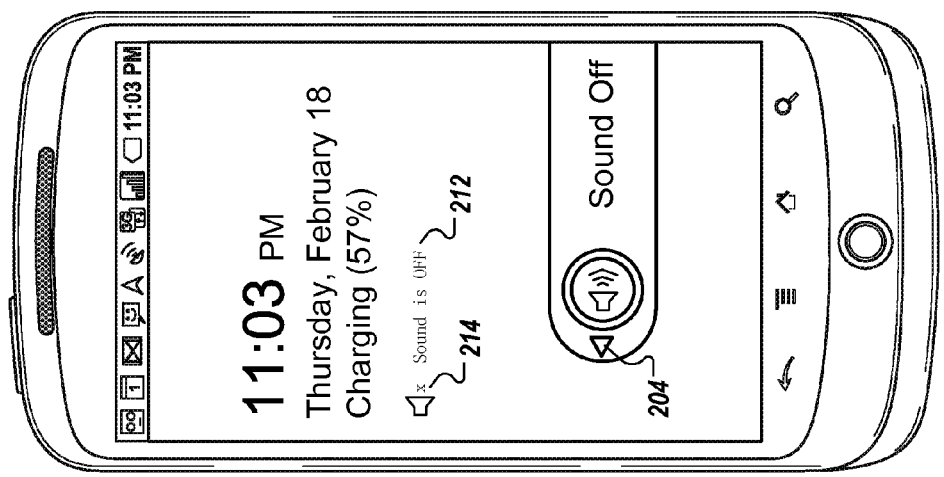

Referring to FIG. 2D, the touchscreen display device 104 displays the unlock tab bar control 102 and a sound on tab bar control 208 where the sound on tab bar control 208 includes a sound on tab graphic 206 in a third region 210 of the sound on tab bar control 208. In some implementations, the sound on tab graphic 206 may be a pictorial representation of the current state of the mobile computing device 100 and the function performed by interacting with the sound on tab bar control 208. For example, the pictorial representation for the sound on tab graphic 206 is a speaker emitting sound with a line drawn diagonally across it signifying the ringer of the mobile computing device 100 is currently disabled and the mobile computing device 100 is silent. Interacting with the sound on tab bar control 208 can enable the ringer of the mobile computing device 100 (e.g., the mobile computing device 100 is no longer silent but can emit audible sounds).

In the implementation shown in FIGS. 2A-2F, the sound on tab bar control 208 and the sound off tab bar control 126 are located on the touchscreen display device 104 at the second default position 134. The touchscreen display device 104 can display the sound on tab graphic 206 included in the sound on tab bar control 208 in a different color than the sound off tab graphic 130 in the sound off tab bar control 126. This can help to additionally distinguish the different states of the mobile computing device 100 represented by the sound off tab graphic 130 and the sound on tab graphic 206.

Referring to FIGS. 2A-2C, in some situations, a user may decide while dragging the sound off tab bar control 126 towards the second contact point 202 that they no longer want to silence the ringer of the mobile computing device 100. The user then removes their finger from the sound off tab graphic 130. This disconnects or breaks the physical contact between the user and the touchscreen display device 104. The sound off tab bar control 126 is no longer dragged across the touchscreen display device 104 and retracts back to the second default position 134. The touchscreen display device 104 displays the sound off tab bar control 126 and the unlock tab bar control 102 as shown in FIG. 2A. The ringer of the mobile computing device 100 remains enabled.

In some implementations, a background wallpaper of the touchscreen display device 104 can be visible behind the sound off tab bar control 126 even as the user drags the sound off tab bar control 126 across the touchscreen display device 104 (e.g., the sound off tab bar control 126 is semitransparent). When the second arrow 204 makes contact with the second contact point 202, the sound off tab bar control 126 can change color and become opaque (e.g., the background wallpaper of the touchscreen display device 104 is no longer visible behind the sound off tab bar control 126).

Figure 2F:
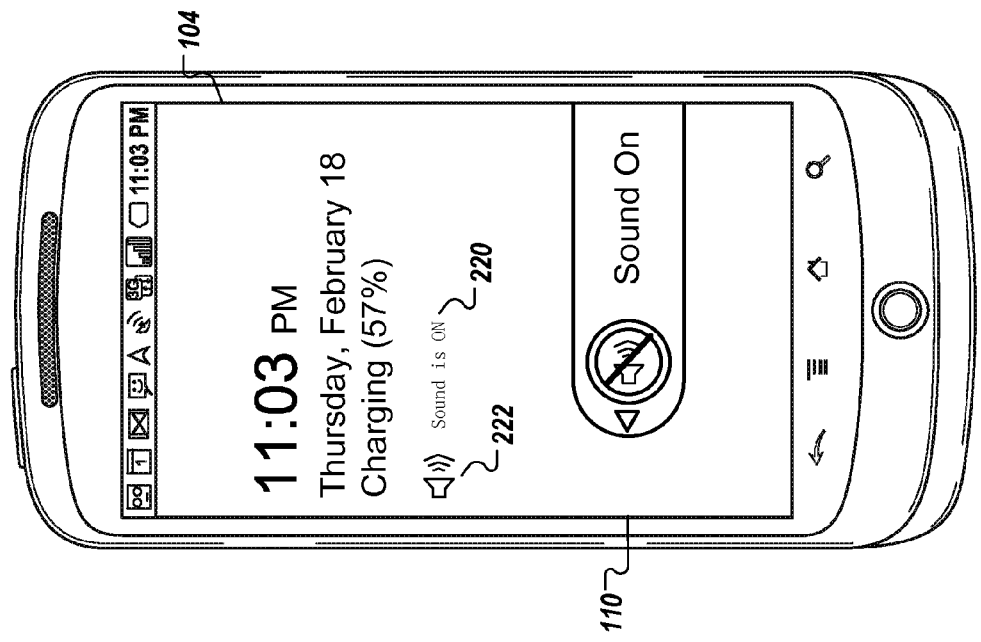
Figure 2E:
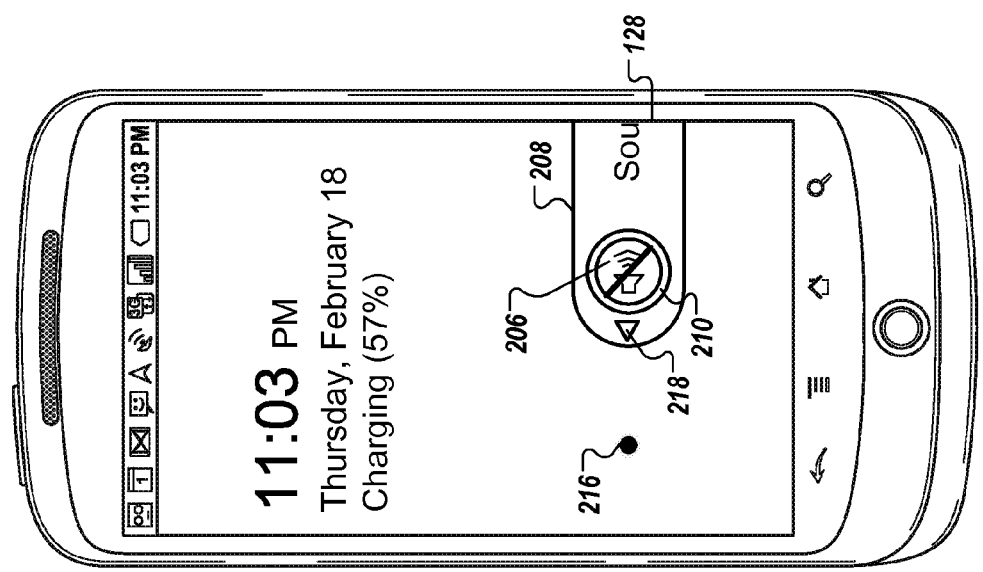

Referring to FIGS. 2D-2F, a user wants to enable the ringer of the mobile computing device 100 while the mobile computing device 100 is in a locked state. For example, the church service is over and the user left the church and is in their car traveling to meet friends for breakfast. The user selects the sound on tab bar control 208 by placing a finger in contact with the sound on tab graphic 206 included in the third region 210 of the sound on tab bar control 208. Upon contact with the sound on tab graphic 206, the unlock tab bar control 102 retracts towards the first edge 110 and is no longer displayed on the touchscreen display device 104. The touchscreen display device 104 then displays a third contact point 216, as shown in FIG. 2E. In some implementations, the mobile computing device 100 provides tactile feedback when the user's finger initially makes contact with the sound on tab graphic 206. In some implementations, while the user's finger remains in contact with the sound on tab graphic 206, the sound on tab graphic 206 and the sound on tab bar control 208 are highlighted (e.g., displayed brighter than before contact).

In a similar manner as the sound off tab bar control 126, while the user's finger maintains contact with the sound on tab graphic 206 in the sound on tab bar control 208, the user, using a pulling motion, can further drag the sound on tab bar control 208 across the touchscreen display device 104. The touchscreen display device 104 animates the display of the sound on tab bar control 208 to extend from the second edge 128 as the user maintains contact with the sound on tab graphic 206. As the touchscreen display device 104 animates the display of the sound on tab bar control 208, the words "Sound On" can be displayed within the sound on tab bar control 208 as the sound on tab bar control 208 is extended, as shown in FIG. 2E. As shown in FIG. 2F, when a third arrow 218 included on the sound on tab bar control 208 makes contact with the third contact point 216, the touchscreen display device 104 displays a sound on indicator 220 showing that the sound for the mobile computing device 100 is turned on. Additionally, the sound on indicator 220 can include a sound on graphic 222 providing a graphic indicator representing the enabling (turning on) of the ringer.

Additionally, when the third arrow 218 makes contact with the third contact point 216, the animation of the sound on tab bar control 208 continues across the touchscreen display device 104 towards the first edge 110 of the touchscreen display device 104. The ringer of the mobile computing device 100 is enabled (e.g., the sound is turned ON for the mobile computing device 100) and the touchscreen display device 104 displays the graphical user interface elements as shown in FIG. 2A.

Referring to FIGS. 2D-2F, in some situations, a user may decide while dragging the sound on tab bar control 208 towards the third contact point 216 that they no longer want to enable the ringer of the mobile computing device 100, turning the sound ON for the mobile computing device 100. The user then removes their finger from the sound on tab graphic 206 disconnecting or breaking the physical contact between the user and the touchscreen display device 104. The sound on tab bar control 208 retracts back to the second default position 134. The touchscreen display device 104 displays the sound on tab bar control 208 and the unlock tab bar control 102 as shown in FIG. 2D. The ringer of the mobile computing device 100 remains disabled, silencing the mobile computing device 100.

In some implementations, similar to the sound off tab bar control 126, the sound on tab bar control 208 is semitransparent allowing a background wallpaper of the touchscreen display device 104 to be visible behind the sound on tab bar control 208 even as the user drags the sound on tab bar control 126 across the touchscreen display device 104. When the third arrow 218 makes contact with the third contact point 216, the sound on tab bar control 208 can change color and become opaque (e.g., the background wallpaper of the touchscreen display device 104 is no longer visible behind the sound on tab bar control 208).

Figure 3B:
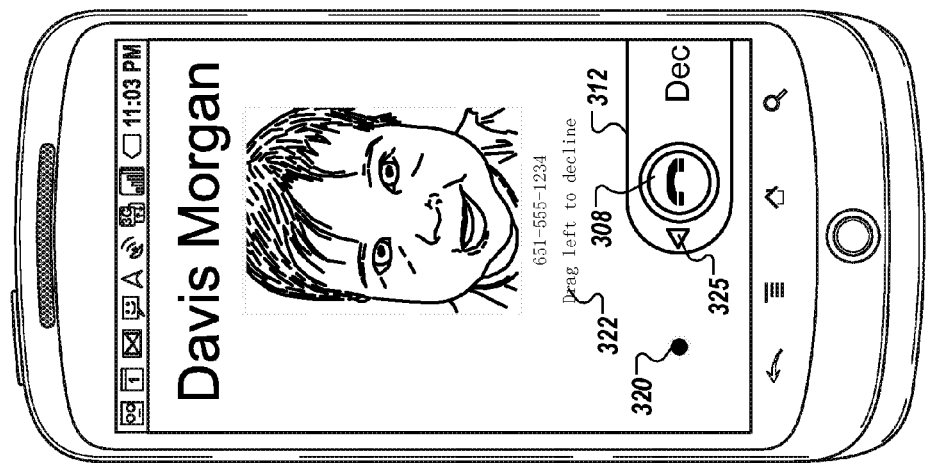
FIGS. 3A-3C are illustrations demonstrating accepting and declining an incoming phone call on a mobile computing device.
Figure 3A:
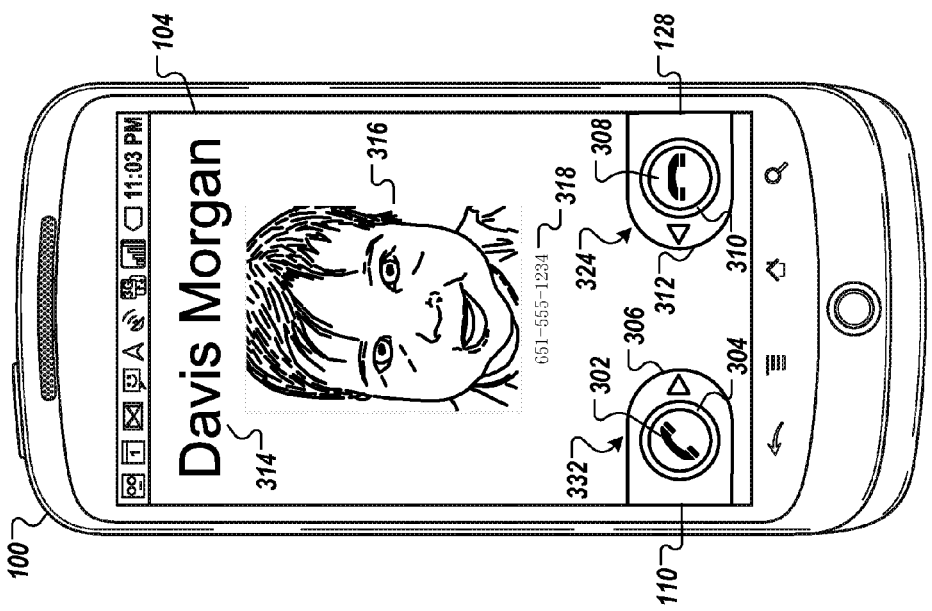
Figure 3C:
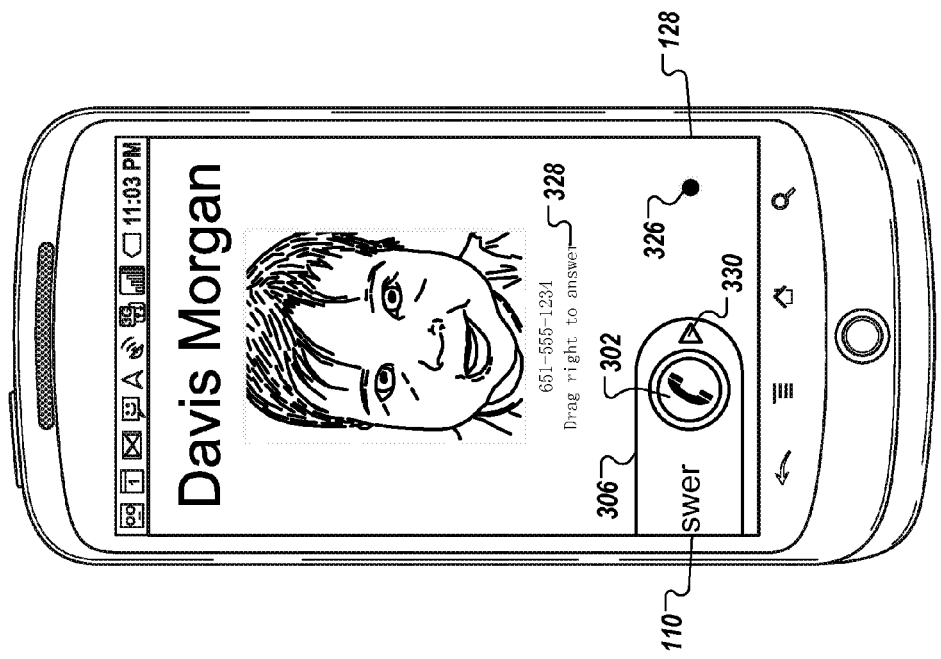

FIGS. 3A-3C are illustrations demonstrating accepting and declining an incoming phone call on the mobile computing device 100. Referring to FIG. 3A, the touchscreen display device 104 displays graphical user interface elements such as an answer tab graphic 302 included in a first phone region 304 of an answer tab bar control 306 and a decline tab graphic 308 included in a second phone region 310 of a decline tab bar control 312. The answer tab bar control 306 is located along the first edge 110 of the touchscreen display device 104. The decline tab bar control 312 is located along the second edge 128 of the touchscreen display device 104.

In some implementations, the answer tab graphic 306 and the decline tab graphic 308 may be pictorial representations of the functions performed by interacting with the answer tab bar control 306 and the decline tab bar control 312 graphical user interface elements, respectively. As shown in FIG. 3A, the pictorial representation for the answer tab graphic 302 is a telephone in a "picked up" or answered state signifying the acceptance or answering of the incoming phone call on the mobile computing device 100. The pictorial representation for the decline tab graphic 308 is a telephone in a "hung up" or unanswered state signifying declining or not answering the incoming phone call on the mobile computing device 100.

Referring to FIG. 3A, when the mobile computing device 100 receives an incoming phone call, the touchscreen display device can display a name for the incoming caller (e.g., caller name 314), a picture of the incoming caller (e.g., caller picture 316) and a phone number for the incoming call (e.g., caller phone number 318).

Referring to the example shown in FIGS. 3A and 3B, a user receives an incoming phone call on the mobile computing device 100 while the mobile computing device 100 is in a locked state. For example, the user is in a meeting with their boss and prefers not to be interrupted by a coworker. On receiving the incoming call and seeing that it is from a coworker (recognizing the name, picture and phone number associated with the incoming phone call), the user decides to decline the incoming call (not answer the call on the mobile computing device 100). In order to decline the incoming call, the user selects the decline tab bar control 312 by placing a finger in contact with the decline tab graphic 308. Upon contact with the decline tab graphic 308, the answer tab bar control 306 disappears or retracts towards the first edge 110 and is no longer displayed on the touchscreen display device 104. The touchscreen display device 104 then displays second phone contact point 320, as shown in FIG. 3B. The second phone contact point 320 generally indicates a threshold measure of movement to be achieved to induce declining of the call. That is, declining the call can occur when a measure of motion of the user's finger across the touchscreen display device 104 is equal to or greater than the threshold measure. Additionally, the touchscreen display device 104 can display decline instructions 322. The decline instructions 322 can indicate to the user the action the user needs to take to decline the incoming phone call.

In some implementations, the mobile computing device 100 provides tactile feedback when the user's finger initially makes contact with the decline tab graphic 308. In some implementations, while the user's finger remains in contact with the decline tab graphic 308, the decline tab graphic 308 and the decline tab bar control 312 are highlighted (e.g., displayed brighter than before contact). While the user's finger maintains contact with the decline tab graphic 308, the user, using a pulling motion, can further drag the decline tab bar control 312 across the touchscreen display device 104 towards the second phone contact point 320, as shown in FIG. 3B. As the user drags the decline tab bar control 312 across the touchscreen display device 104, the touchscreen display device 104 animates the display of the decline tab bar control 312 to extend from the second edge 128. As the touchscreen display device 104 animates the display of the decline tab bar control 312, the term "Decline" can be displayed within the decline tab bar control 312 as the decline tab bar control 312 is extended. When a second phone arrow 325 included on the decline tab bar control 312 makes contact with the second phone contact point 320, the decline tab bar control 312 changes color. The animation of the decline tab bar control 312 continues across the touchscreen display device 104 towards the first edge 110 and is then no longer displayed on the touchscreen display device 104. The incoming phone call is then declined or not answered by the user (e.g., the mobile computing device 100 no longer indicates there is an incoming call and the caller is connected to the user's voicemail). The touchscreen display device 104 then displays the graphical user interface elements shown in FIG. 2A.

Referring to FIGS. 3A-3B, in some situations, a user may decide, while dragging the decline tab bar control 312 towards the second phone contact point 320, that they no longer want to decline or not answer the incoming call. The user then removes their finger from the decline tab graphic 308. This disconnects or breaks the physical contact between the user and the touchscreen display device 104. The decline tab bar control 312 is no longer dragged across the touchscreen display device 104 and retracts back to a second phone default position 324. The touchscreen display device 104 displays the decline tab bar control 312 including the decline tab graphic 308 and the answer tab bar control 306 including the answer tab graphic 302 as shown in FIG. 3A. The mobile computing device 100 continues to receive the incoming call.

Referring to FIGS. 3A and 3C, the user, in order to answer the incoming call, selects the answer tab bar control 306 by placing a finger in contact with the answer tab graphic 302. Upon contact with the answer tab graphic 302, the decline tab bar control 312 disappears or retracts towards the second edge 128 and is no longer displayed on the touchscreen display device 104. The touchscreen display device 104 then displays first phone contact point 326, as shown in FIG. 3C. The first phone contact point 326 generally indicates a threshold measure of movement to be achieved to induce answering of the call. That is, answering the call can occur when a measure of motion of the user's finger across the touchscreen display device 104 is equal to or greater than the threshold measure. Additionally, the touchscreen display device 104 can display answer instructions 328. The answer instructions 328 can indicate to the user the action the user needs to take in order to answer the incoming phone call.

In some implementations, the mobile computing device 100 provides tactile feedback when the user's finger initially makes contact with the answer tab graphic 302. In some implementations, while the user's finger remains in contact with the answer tab graphic 302, the answer tab graphic 302 and the answer tab bar control 306 are highlighted (e.g., displayed brighter than before contact). While the user's finger maintains contact with the answer tab graphic 302, the user, using a pulling motion, can further drag the answer tab bar control 306 across the touchscreen display device 104 towards the first phone contact point 326, as shown in FIG. 3C. As the user drags the answer tab bar control 306 across the touchscreen display device 104, the touchscreen display device 104 animates the display of the answer tab bar control 306 to extend from the first edge 110. As the touchscreen display device 104 animates the display of the answer tab bar control 306, the term "Answer" can be displayed within the answer tab bar control 306 as the answer tab bar control 306 is extended. When a first phone arrow 330 included on the answer tab bar control 306 makes contact with the first phone contact point 326, the answer tab bar control 306 changes color. The animation of the answer tab bar control 306 continues across the touchscreen display device 104 towards the second edge 128 and is then no longer displayed on the touchscreen display device 104. The user answers the incoming phone call. The touchscreen display device 104 then displays graphical user interface elements (not shown) related to the handling of the receipt of the incoming call (e.g., a graphical user interface element to end the call).

In some situations, a user may decide while dragging the answer tab bar control 306 towards the first phone contact point 326 that they no longer want to answer the incoming call. The user then removes their finger from the answer tab graphic 302. This disconnects or breaks the physical contact between the user and the touchscreen display device 104. The answer tab bar control 306 is no longer dragged across the touchscreen display device 104 and retracts back to a first phone default position 332 as shown in FIG. 3A. The touchscreen display device 104 displays the answer tab bar control 306 and the decline tab bar control 312 as shown in FIG. 3A. The mobile computing device 100 continues to receive the incoming call.

Figure 4:
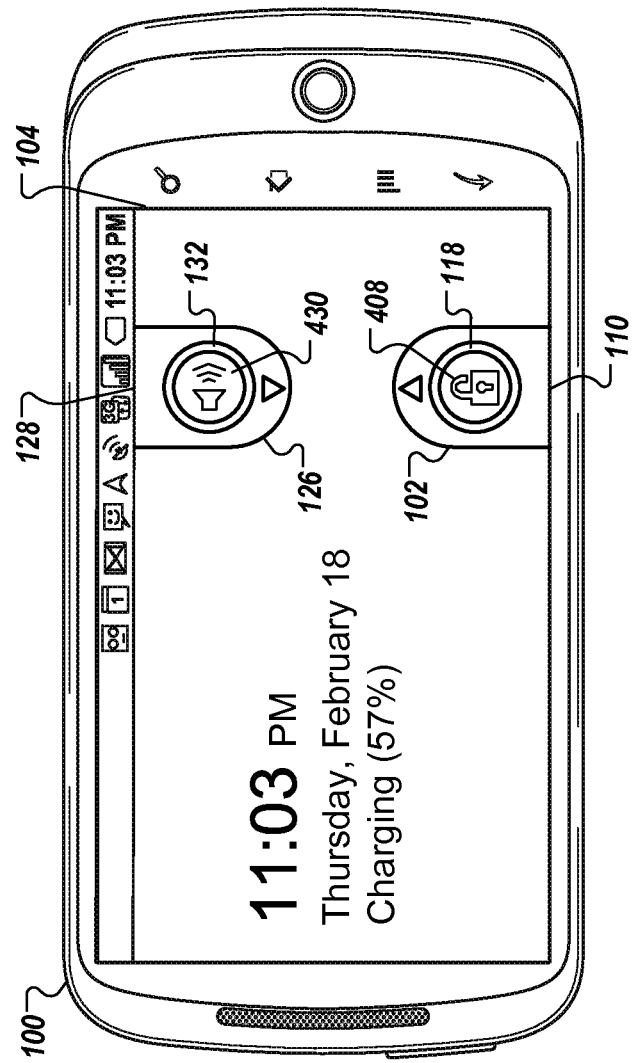
FIG. 4 is an illustration showing graphical user interface elements on a mobile computing device when oriented in a landscape mode.

FIG. 4 is an illustration showing graphical user interface elements on the mobile computing device 100 when oriented in a landscape mode. The examples shown in FIGS. 1A-1D, 2A-2F and 3A-3C are illustrated on the mobile computing device 100 when oriented in a portrait mode. The example tab bar controls and their functionality described in FIGS. 1A-1D, 2A-2F and 3A-3C can be implemented on the mobile computing device 100 when oriented in a landscape mode. FIG. 4 shows an example of graphical user interface elements that can include an alternative unlock tab graphic 408 included in the first region 118 of the unlock tab bar control 102 and an alternative sound off tab graphic 430 included in the second region 132 of the sound off tab bar control 126. The alternative unlock tab graphic 408 and the alternative sound off tab graphic 430 are oriented to appear correctly to the user when the mobile computing device 100 is held in the landscape mode.

The unlock tab bar control 102 is located along the first edge 110 of the touchscreen display device 104. The sound off tab bar control 126 is located along the second edge 128 of the touchscreen display device 104. As shown in FIG. 1A and FIG. 4, the location of the unlock tab bar control 102 and the sound off tab bar control 126 remain the same on the touchscreen display device 104. The tab graphics are adjusted accordingly for landscape and portrait mode. The user interaction with the tab bar controls is the same for both the landscape mode and portrait mode. However, the user motion when dragging the tab bar control in the landscape mode is up and down as opposed to the side-to-side motion used when the mobile computing device 100 is in the portrait mode. The functionality of the graphical user interface elements on the mobile computing device 100 remains the same in both the landscape and portrait modes.

Figure 5:
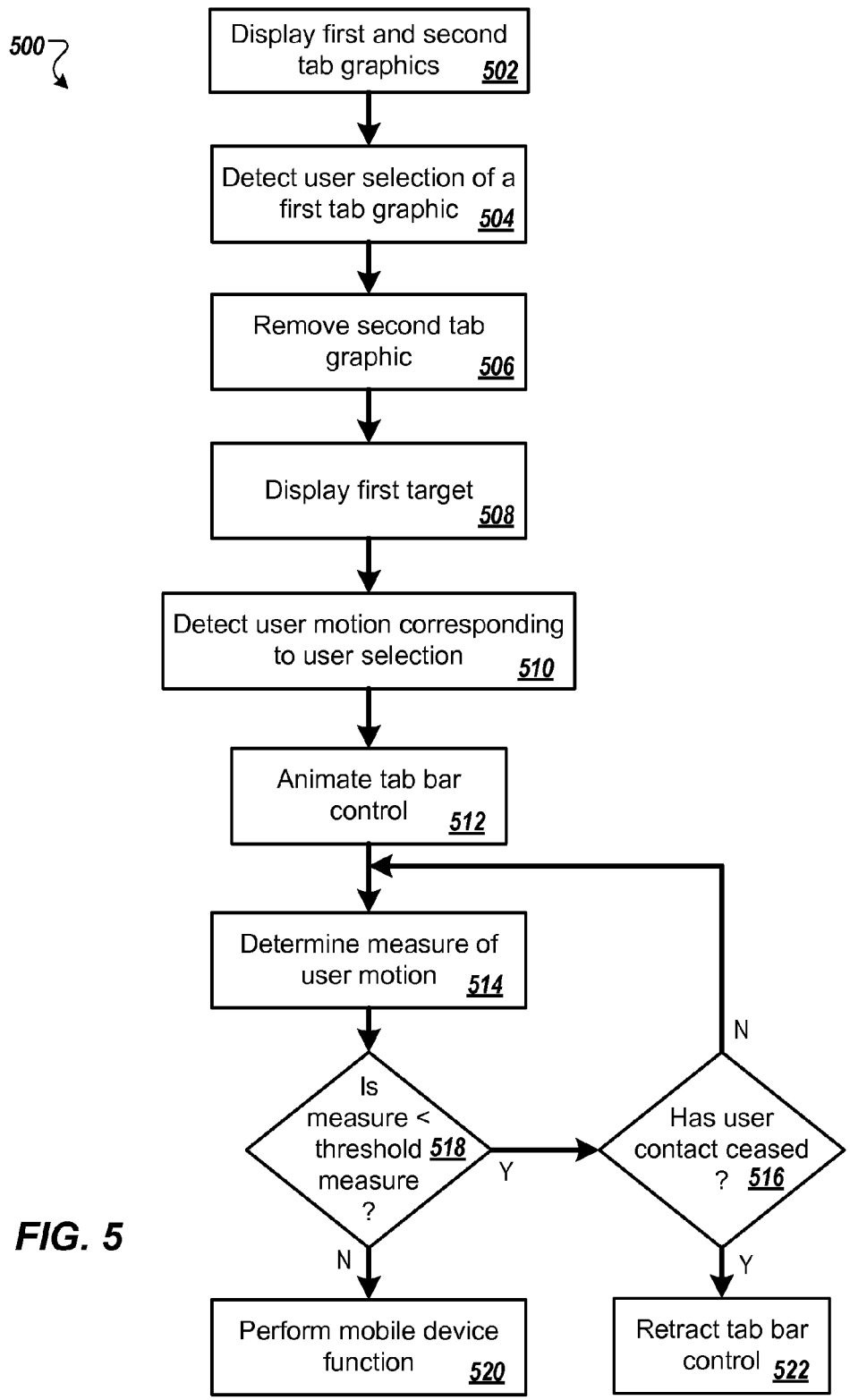
FIG. 5 is a flowchart of an exemplary process for using a tab bar control.

FIG. 5 is a flowchart of an exemplary process 500 for using a tab bar control. The process 500 can be used with the tab bar controls described in FIGS. 1A-1D, FIGS. 2A-2F, FIGS. 3A-3C and FIG. 4.

The process 500 begins by displaying first and second tab graphics (502). For example, referring to FIG. 1A, the mobile computing device 100 displays the unlock tab graphic 108 and the sound off tab graphic 130 on the touchscreen display device 104. The process 500 continues by detecting user selection of the first tab graphic (504). For example, the user places their finger on the unlock tab graphic 108 resulting in contact being made between the user and the touchscreen display device 104 and the selection of the unlock tab graphic 108 by the user. The second tab graphic is removed (506). For example, the touchscreen display device 104 no longer displays the sound off tab graphic 130 and the sound off tab bar control 126. A first target is displayed (508). For example, the touchscreen display device 104 displays the first contact point 120. User motion corresponding to the user selection is detected (510). The tab bar control is animated (512). For example, referring to FIG. 1C, the mobile computing device 100 detects the pulling motion by the user of the unlock tab graphic 108 resulting in the animation of the unlock tab bar control 102 across the touchscreen display device 104 towards the first contact point 120. The measure of user motion is determined (514). In step 518, if the measure of user motion is less than the threshold measure and, in step 516, it is determined that user contact with the tab graphic has not ceased, the process 500 continues to step 514 and the measure of user motion is again determined. The measure can include a distance and the threshold measure can include a threshold distance. In step 518, if the measure of user motion is less than the threshold measure and, in step 516, it is determined that user contact with the tab graphic has ceased, the tab bar control is retracted (522). In step 518, if the measure of user motion is equal to or greater than the threshold measure, the mobile device function is performed (520). For example, referring to FIGS. 1C and 1D, the mobile computing device 100 determines contact has been made between first arrow 122 and the first contact point 120. The mobile computing device 100 performs the function associated with the first tab graphic. For example, referring to FIG. 1D, the mobile computing device 100 unlocks and displays the graphical user interface 124.

The use of the tab bar controls described with reference to FIGS. 1A-1D, FIGS. 2A-2F, FIGS. 3A-3C and FIG. 4 requires continual physical contact between the user and the touchscreen display device 104 in order to perform the task represented by the tab bar control (e.g., unlocking the mobile computing device 100, answering an incoming call, etc.). In addition, the mobile computing device 100 may not perform the task until the user drags the tab bar control across the touchscreen display device 104 and contacts the contact point on the touchscreen display device 104 related to the tab bar control. The need for continual physical contact between the user and the touchscreen display device 104 and, in addition, the requirement to have the tab bar control contact a contact point prior to performing a task makes the likelihood of an inadvertent trigger of the task on the mobile computing device 100 small. For example, it would be difficult if not impossible for the mobile computing device 100 to be unlocked from a locked state while in the user's pocket.

In some implementations, when the user is holding the mobile computing device 100 in a portrait mode, the user maintaining their finger on a tab graphic accomplishes the continual physical contact needed between the user and the touchscreen display device 104. The user, while maintaining this contact, uses a pulling, side-to-side motion to drag the tab bar control across the touchscreen display device 104. The touchscreen display device 104 can have a certain tolerance for up and down motion by the user while maintaining contact on the tab graphic. However, if the user exceeds the tolerance, the touchscreen display device 104 will interpret the movement as disconnecting or breaking the contact between the user and the touchscreen display device 104 and the tab bar control will retract towards its associated edge. The task associated with the tab bar control will not be performed (e.g., the mobile computing device 100 remains locked).

In some implementations, when the user is holding the mobile computing device 100 in a landscape mode, the user keeps their finger on a tab graphic accomplishing the continual physical contact needed between the user and the touchscreen display device 104. The user, while maintaining this contact, uses a pulling motion to drag the tab bar control up and down the touchscreen display device 104. The touchscreen display device 104 can have a certain tolerance for side-to-side motion by the user while maintaining contact on the tab graphic. However, if the user exceeds the tolerance, the touchscreen display device 104 will interpret the movement as disconnecting or breaking the contact between the user and the touchscreen display device 104 and the tab bar control will retract towards its associated edge. The task associated with the tab bar control will not be performed (e.g., the mobile computing device 100 remains locked).

In some implementations, the user maintains their finger on a tab graphic accomplishing the continual physical contact needed between the user and the touchscreen display device 104. The user, while maintaining this contact, may use a pulling motion to drag the tab bar control forward across the touchscreen display device 104 to contact a contact point. The task associated with the tab bar control can be performed once the tab bar control contacts the contact point. The user, while maintaining contact with the tab graphic, may also drag the tab bar control backwards towards the originating edge of the touchscreen display device 104 for the tab bar control. This backwards movement can result in the tab bar control returning to its default position. The tab bar control can return to its default position because of the backwards movement of the tab bar control by the user and because of some retracting of the tab bar control once it reaches a certain point on the touchscreen display device 104. The task associated with the tab bar control will not be performed. For example, referring to FIGS. 2A and 2B, the user may drag the sound off tab bar control 126 backwards towards second edge 128 resulting in the sound off tab bar control 126 retracting back to its second default position 134. The sound will then remain on for the mobile computing device 100. In some implementations, any backwards movement of the tab bar control will result in the tab bar control retracting to its default position. The task associated with the tab bar control will not be performed.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations and all of the functional operations described in this specification may be provided in digital electronic circuitry, or in computer software, firmware, or hardware, including the structures disclosed in this specification and their structural equivalents, or in combinations of one or more of them. Implementations may be provided as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be provided on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be provided in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A mobile device, comprising:
   a touchscreen display;
   one or more processors; and
   a computer-readable storage medium coupled to the one or more processors having instructions stored thereon which, when executed by the one or more processors, cause the one or more processors to perform operations comprising:
      displaying a first tab graphic in a first tab bar control and a second tab graphic in a second, separate tab bar control, the first tab bar control being displayed at a first default position on a first edge of the touchscreen display and the second tab bar control being displayed at a second default position on a second, opposite edge of the touchscreen display;
      detecting a user selection in a first region of the touchscreen display, the first region being associated with the first tab graphic;
      upon detecting the user selection, removing the second tab graphic from display on the touchscreen display;
      detecting user motion corresponding to the user selection;
      animating the first tab bar control to extend from the first edge of the touchscreen display to a first target in response to detecting the user motion, the first target displayed at the second default position;
      determining a measure of the user motion;
      comparing the measure of the user motion to a threshold measure; and
      performing one or more functions on the mobile device in response to the measure of the user motion being equal to or greater than the threshold measure.

2. The mobile device of claim 1, wherein the one or more functions comprise entering or exiting an unlocked mode, answering or declining a received call, and changing a mode of a ringer.

3. The mobile device of claim 1, wherein the operations further comprise continuing animation of the first tab bar control to extend from the first edge to a second edge of the touchscreen display in response to the degree of user motion exceeding the threshold measure.

4. The mobile device of claim 1, wherein the operations further comprise:
   detecting cessation of the user selection;
   determining, upon detecting cessation of the user selection, that the measure of the user motion is less than the threshold measure; and
   animating the first tab bar control to retract back toward the first edge of the touchscreen display to the first default position.

5. The mobile device of claim 1, wherein the one or more operations further comprise:
   removing the first tab bar control from the touchscreen display; and
   displaying a plurality of icons on the touchscreen display, each icon corresponding to a respective application executable by the mobile device.

6. The mobile device of claim 1, wherein the operations further comprise displaying the first target in response to detecting the user selection in the first region, wherein the first tab control bar is animated to extend towards the first target without displaying a defined path between the first tab bar control and the first target.

7. The mobile device of claim 1, wherein the operations further comprise:
   displaying the first target in response to detecting the user selection in the first region; and
   displaying a defined path between the first tab bar control and the first target, wherein the first tab control bar is animated to extend towards the first target along the defined path.

8. The mobile device of claim 1, wherein the operations further comprise:
   displaying the first target on the touchscreen display in response to detecting the user selection in the first region, the first target corresponding to the threshold measure; and
   determining that the measure of the user motion is equal to or greater than the threshold measure when the first tab control bar contacts the first target on the touchscreen display.

9. The mobile device of claim 1, wherein the operations further comprise displaying scrolling text within the first tab bar control as the first tab control bar extends from the first edge of the touchscreen display, the scrolling text indicating the at least one or more functions.

10. The mobile device of claim 1, wherein the operations further comprise highlighting the first tab graphic upon detecting the user selection.

11. The mobile device of claim 10, wherein highlighting comprises changing a color of the first tab graphic from a first color to a second color, the second color being brighter than the first color.

12. The mobile device of claim 1, wherein the operations further comprise:
   detecting an orientation change of the mobile device; and
   rotating the first tab graphic in the first tab bar control in response to detecting the orientation change.

13. The mobile device of claim 1, wherein the measure comprises a distance and the threshold measure comprises a threshold distance.

14. The mobile device of claim 1, wherein the operations further comprise changing the first tab graphic in response to the measure of the user motion being equal to or greater than the threshold measure.

15. A non-transitory computer storage medium encoded with a computer program, the program comprising instructions that when executed by one or more computers cause the one or more computers to perform operations comprising:
- displaying a first tab graphic in a first tab bar control and a second tab graphic in a second, separate tab bar control, the first tab bar control being displayed at a first default position on a first edge of a touchscreen display of a mobile device and the second tab bar control being displayed at a second default position on a second, opposite edge of the touchscreen display of the mobile device;
- detecting a user selection in a first region of the touchscreen display, the first region being associated with the first tab graphic;
- upon detecting the user selection, removing the second tab graphic from display on the touchscreen display;
- detecting user motion corresponding to the user selection;
- animating the first tab bar control to extend from the first edge of the touchscreen display to a first target in response to detecting the user motion, the first target displayed at the second default position;
- determining a measure of the user motion;
- comparing the measure of the user motion to a threshold measure; and
- performing one or more functions on the mobile device in response to the measure of the user motion exceeding the threshold measure.

16. A computer-implemented method comprising:
- displaying a first tab graphic in a first tab bar control and a second tab graphic in a second, separate tab bar control, the first tab bar control being displayed at a first default position on a first edge of a touchscreen display of a mobile device and the second tab bar control being displayed at a second default position on a second, opposite edge of the touchscreen display of the mobile device;
- detecting a user selection in a first region of the touchscreen display, the first region being associated with the first tab graphic;
- upon detecting the user selection, removing the second tab graphic from display on the touchscreen display;
- detecting user motion corresponding to the user selection;
- animating the first tab bar control to extend from the first edge of the touchscreen display to a first target in response to detecting the user motion, the first target displayed at the second default position;
- determining a measure of the user motion;
- comparing the measure of the user motion to a threshold measure; and
- performing one or more functions on the mobile device in response to the measure of user motion exceeding the threshold measure.

* * * * *